US010814693B2

(12) United States Patent
Guerineau

(10) Patent No.: US 10,814,693 B2
(45) Date of Patent: Oct. 27, 2020

(54) PROCESS OF OPERATING THE AIR CONDITIONING SYSTEM OF A CAB OF A MACHINE

(71) Applicant: CNH Industrial America LLC, New Holland, PA (US)

(72) Inventor: Christophe Guerineau, Rocheserviere (FR)

(73) Assignee: CNH Industrial America LLC, New Holland, PA (US)

( * ) Notice: Subject to any disclaimer, the term of this patent is extended or adjusted under 35 U.S.C. 154(b) by 196 days.

(21) Appl. No.: 15/988,370

(22) Filed: May 24, 2018

(65) Prior Publication Data

US 2018/0264910 A1    Sep. 20, 2018

Related U.S. Application Data

(63) Continuation of application No. PCT/EP2016/078723, filed on Nov. 24, 2016.

(30) Foreign Application Priority Data

Nov. 24, 2015 (EP) .................................... 15306861

(51) Int. Cl.
*B60H 1/00* (2006.01)
*E02F 9/16* (2006.01)
*B60H 3/00* (2006.01)

(52) U.S. Cl.
CPC ......... *B60H 1/00378* (2013.01); *B60H 1/008* (2013.01); *B60H 1/00735* (2013.01); *B60H 1/00849* (2013.01); *E02F 9/163* (2013.01)

(58) Field of Classification Search
None
See application file for complete search history.

(56) References Cited

U.S. PATENT DOCUMENTS 4,344,356 A * 8/1982 Casterton ........... B62D 33/0617
454/139
5,120,271 A * 6/1992 Shtanko ............... B60H 3/0085
340/438

(Continued)

FOREIGN PATENT DOCUMENTS

EP       1908345 A1    4/2008
EP     2 815 907 A2   12/2014

(Continued)

OTHER PUBLICATIONS

Notification of Transmittal of the International Search Report and the Written Opinion of the International Searching Authority, or the Declaration dated Feb. 6, 2017 for International Application No. PCT/EP2016/078723 (11 pages).

(Continued)

*Primary Examiner* — Edelmira Bosques
*Assistant Examiner* — Christopher Matthew Odell
(74) *Attorney, Agent, or Firm* — Peter Zacharias; Patrick Sheldrake

(57) ABSTRACT

A process for operating a machine having a cab and an air conditioning system. The air conditioning system includes a circuit configured for supplying the cab with air coming from a recycling branch fed with air coming from an interior of the cab and an exterior branch fed with air coming from an exterior of the cab, a blowing device, and a filtration system. The process includes the steps of operating the air conditioning system in a regular procedure, monitoring of a signal indicative of a potential contamination of the cab, and upon the detection of such signal, operating the air conditioning system in a flushing procedure. The flushing procedure includes increasing the air flow supplied in the cab, controlling a flow of air to supply air only from the exterior (Continued)

branch, and opening an exhaust flap within the cab for increasing a flow of air evacuated from the cab.

12 Claims, 8 Drawing Sheets

(56) References Cited

U.S. PATENT DOCUMENTS

| | | | | |
|---|---|---|---|---|
| 5,330,385 | A | 7/1994 | Hotta et al. | |
| 5,876,277 | A * | 3/1999 | Uemura | B60H 1/00849 454/139 |
| 6,209,331 | B1 * | 4/2001 | Lake | B60H 1/00278 62/180 |
| 6,758,739 | B1 * | 7/2004 | Sangwan | B60H 1/008 454/139 |
| 7,681,630 | B2 * | 3/2010 | Klassen | B60H 1/00378 165/202 |
| 10,538,140 | B2 * | 1/2020 | Davter | B60H 1/00378 |
| 2008/0014856 | A1 | 1/2008 | Voit et al. | |
| 2008/0081549 | A1 | 4/2008 | Ballu | |
| 2010/0241306 | A1 * | 9/2010 | Akisada | H01T 23/00 701/33.4 |
| 2012/0264361 | A1 * | 10/2012 | Scheer | B60H 3/0035 454/75 |
| 2014/0262132 | A1 | 9/2014 | Connell | |

FOREIGN PATENT DOCUMENTS

| | | |
|---|---|---|
| JP | 2000-52742 A | 2/2000 |
| JP | 2008-201224 A | 9/2008 |
| JP | 2015122975 A | 7/2015 |

OTHER PUBLICATIONS

Examination report No. 1 for AU 2016360884, dated Feb. 4, 2019 (4 pages).

First Examination Report for NZ 742682, dated Sep. 10, 2018 (5 pages).

* cited by examiner

PROCESS OF OPERATING THE AIR CONDITIONING SYSTEM OF A CAB OF A MACHINE

CROSS REFERENCE TO RELATED APPLICATION

This application is a continuation of PCT International Application No. PCT/EP2016/078723 filed Nov. 24, 2016, which claims priority to European Application No. 15306861.4 filed Nov. 24, 2015, the contents of which are incorporated herein by reference.

FIELD OF THE INVENTION

The present invention relates to a process of operating the air conditioning system of a cab of a machine, and a machine, in particular an agricultural machine, including a cab equipped with an air conditioning system which is adapted to be operated according to such a process.

BACKGROUND OF THE INVENTION

Agricultural machines are known, including a motorized support structure which is equipped with a driver station and movable in particular along rows of plants and/or furrows of an agricultural field. A spreading unit can be mounted on the structure for straddling at least one of the rows and spreading determined measures of at least one treatment product on the rows.

In particular, such machines are driven by a human operator seating in a closed cab of the driver station for actuating the commands means for moving the machine and/or operating the spreading unit.

The spreading unit can spread treatment products, such as phytosanitary products, insecticides or fertilizers, on the harvest plants and/or the plowed soil of an agricultural field, such as a vineyard or an orchard. Treatment products used in the agricultural domain may be harmful. In particular, during spreading operations, a quantity of such products may diffuse in the air, in particular in the form of dusts, aerosols and/or vapors, and form air pollutants which, if there are inhaled by the operator, in particular repeatedly, may cause undesired effects.

For limiting the exposure of the operator to such air pollutants, cabs are generally equipped with air conditioning systems that are adapted to condition the air circulating in the cabs, in particular by feeding the cabs with air that is mainly free from such pollutants.

In particular, such air-conditioning systems are known, including:
- a circuit for supplying the cab with air coming from a recycling branch, that is fed with recycled air coming from the interior of the cab, and an exterior branch, that is fed with air coming from the exterior of the cab;
- a blowing device for providing an air flow inside the circuit;
- filtration means for removing pollutants from the air blown in the cab through the circuit;

the air-conditioning systems being operated according to a regular procedure to balance the air supplied by each of the recycling and exterior branches, for example to supply the cab with fresh air comprising approximately 80% of recycled air coming from the recycling branch and approximately 20% of exterior air coming from the exterior branch.

Besides, such air-conditioning systems may comply with strict regulatory texts, such as the European standard EN-15695, in particular as regards the air flow debit, the air pressurization inside the cab and the quality of the filtration systems. For example, this standard defines four levels or categories for the security provided to the operator, from a minimum security level (category 1) wherein the health risks are minimal, for instance when the machine is driven on a road, to a maximum security level (category 4), wherein the machine is driven on a field to spray highly polluting and volatile products.

However, these requirements are not totally satisfactory, as they cannot efficiently protect the operator in case of a contamination of the cab with air pollutants as described above. Indeed, when polluted air enters into the cab, for example upon opening of an access of the cab by the operator, the polluted air is difficult and slow to evacuate, in particular as the air provided by the air-conditioning system mainly comprises recycled air coming from the cab, i.e. potentially polluted air.

What is needed in the art is an efficient air conditioning system process of operating the air conditioning system of the cab for filtering air pollutants diffused around the cab.

SUMMARY OF THE INVENTION

According to an exemplary embodiment of the invention, a process of operating the air conditioning system of a cab of a machine is provided, the air-conditioning system including:
- a circuit for supplying the cab with air coming from a recycling branch fed with air coming from the interior of the cab and an exterior branch fed with air coming from the exterior of the cab;
- a blowing device for providing an air flow inside the circuit;
- a filtration system for removing pollutants from the air blown in the cab through the circuit.

The air conditioning system being operable to control, e.g. balance, in the supplied air flow, the amount of air coming from the recycling branch versus the amount of air coming from the exterior branch. The process includes a regular procedure wherein the air-conditioning system is operated to balance the air flow to supply air coming from each of the recycling and exterior branches. The process further includes the monitoring of a signal indicative of a potential contamination of the interior of the cab and, upon the detection of such signal, a flushing procedure wherein the air conditioning system is operated to:
- increase the flow of air supplied into the cab by the blowing device through the circuit;
- control the flow of air to supply air coming only from the exterior branch by closing the recycling branch; and
- open an exhaust flap within the cab for increasing the flow of air evacuated from the cab. The flushing procedure being performed for a determined period of time before performing again the regular procedure.

According to another exemplary embodiment of the present invention, there is provided a machine, in particular an agricultural machine, including a cab equipped with an air conditioning system which is adapted to be operated according to such a process.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The machine can be an agricultural machine arranged for the mechanical or pressurized spreading of treatment products, such as phytosanitary products, insecticides or fertilizers, on the harvest plants and/or the plowed soil of an agricultural field, such as a vineyard or an orchard.

To do so, the machine may include a motorized support structure which is equipped with a driver station and movable in particular along rows of plants and/or furrows of an agricultural field. A spreading unit can be mounted on the structure for straddling at least one of the rows and spreading determined amounts of at least one treatment product on the rows.

In particular, the spreading unit can be mounted on the support structure permanently or removably, so as to be replaceable by other equipment and accessories, for example harvesting equipment, pruning equipment, or equipment for working the soil.

The machine is in particular adapted to be driven by a human operator. To do so, the driver station comprises a closed cab 1 wherein the operator is intended to seat for actuating the commands for moving the machine and/or operating the spreading unit.

Figure 1:
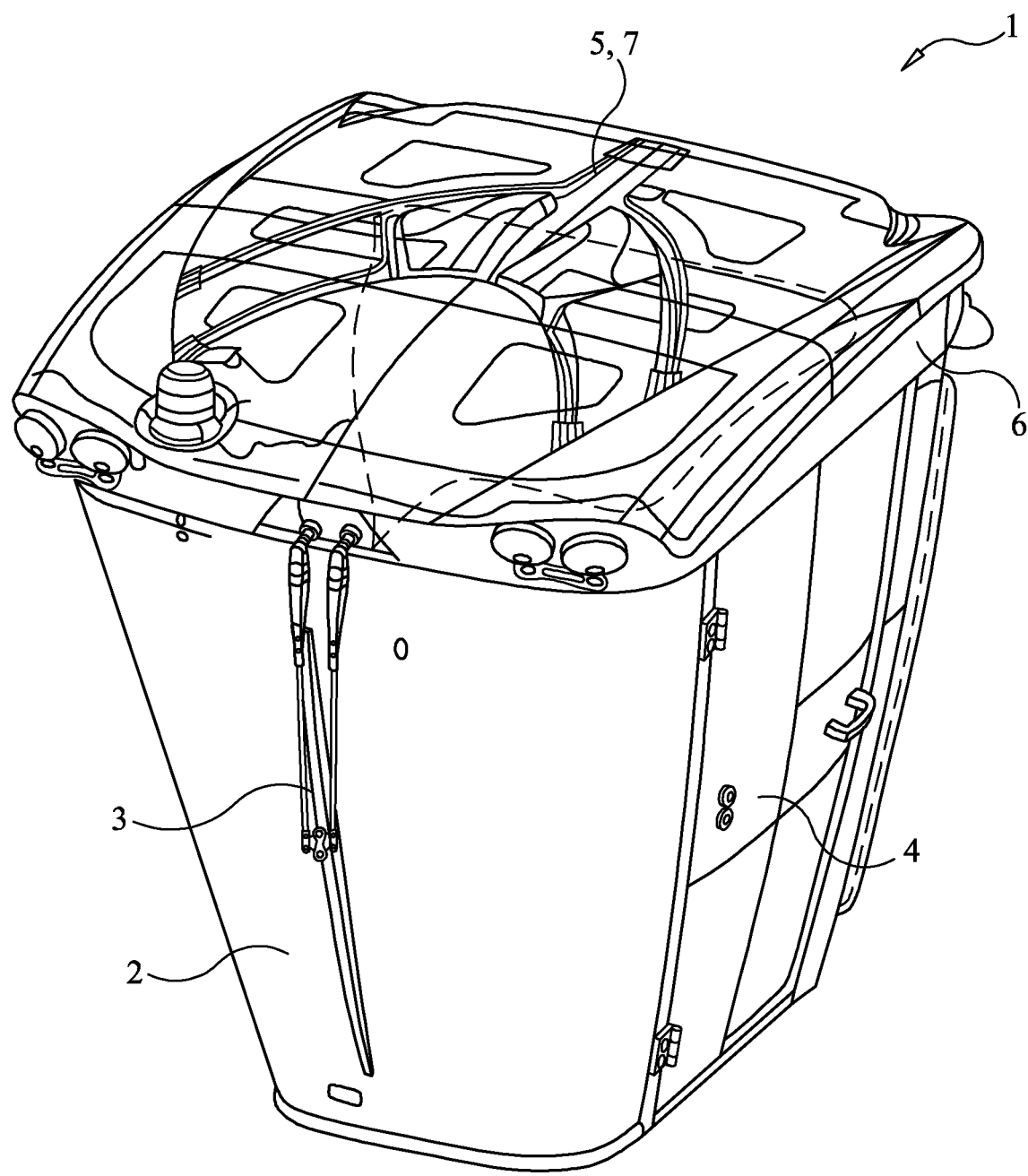
FIG. 1 represents schematically in a perspective view a cab of a machine according to the present invention.

As shown in FIG. 1, the cab 1 includes a front windshield 2 made from a substantially transparent and solid material, for example laminated glass, for protecting the operator from wind and/or rain while ensuring a good visibility to allow the operator to safely drive and operate the machine, as well as a device 3 for remotely controlled washing of the windshield, in particular with an adapted product, for removing dirt that can potentially hinder the visibility. Moreover, the cab 1 includes at least an access, in particular a lateral access door 4, for allowing the operator to enter and to leave the cab 1.

Direct contact with treatment products used in the agricultural domain may be harmful. In particular, during spreading operations, a quantity of such products may diffuse in the air, in particular in the form of dusts, aerosols and/or vapours, and then may form air pollutants which, if they are inhaled by the operator, in particular repeatedly, may cause in the long term undesired effects.

For limiting the risk of exposure of the operator to such air pollutants, the cab 1 is equipped with an air conditioning system 5 that is adapted to condition the air circulating in the cab, in particular by feeding the cab with air that is principally free from such pollutants.

The air conditioning system 5 is implemented in the roof of the cab 1, in particular into a sealed compartment 6 which is fixed, for example by gluing, underneath the roof, and which is accessible from the exterior of the cab 1 by way of an upper removable maintenance cover 7. In particular, the maintenance cover 7 includes a peripheral edge which is equipped with a sealing gasket 8, so as to ensure the sealed closing of the compartment 6.

The air conditioning system 5 may also include:
- a control board card 21 for steering the operation of the system, in particular upon communication with command means implemented within the cab 1, according to a predetermined process;
- a circuit 9 which supplies the cab 1 with air coming from a recycling branch 9a fed with air coming from the interior of the cab and an exterior branch 9b fed with air coming from the exterior of the cab;
- a blowing device 10 (e.g., a fan) for providing an air flow inside the circuit;
- filtration means 11 for removing pollutants from the air blown in the cab through the circuit.

Figure 2A:
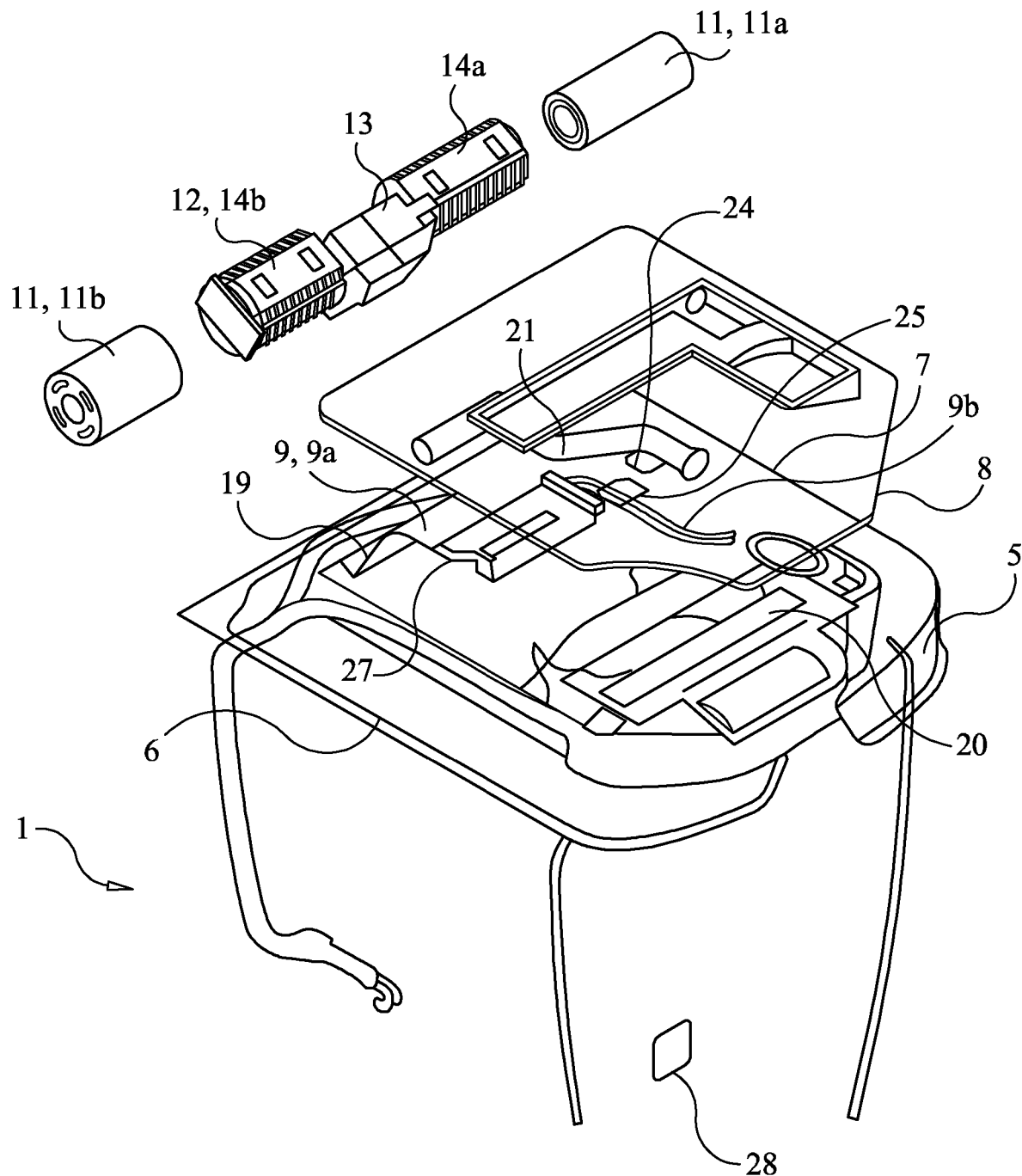
FIG. 2A represents schematically in a partial exploded view the air conditioning system of the cab of FIG. 1.
Figure 2B:
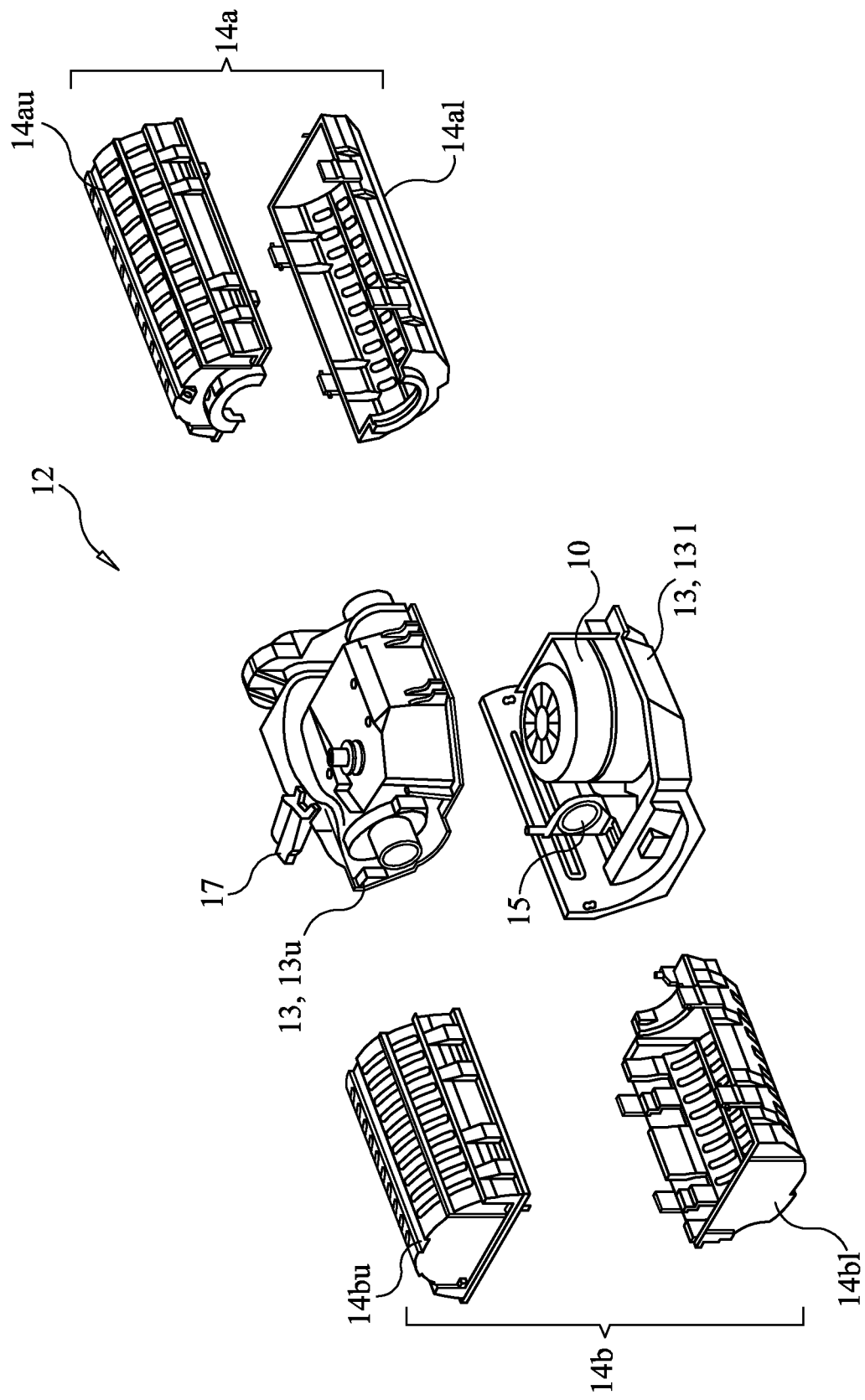
FIG. 2B represents in an exploded view the filtration and pressurization set of the system for switching between first and second filtration modes according to a first embodiment of the invention.
Figure 4A:
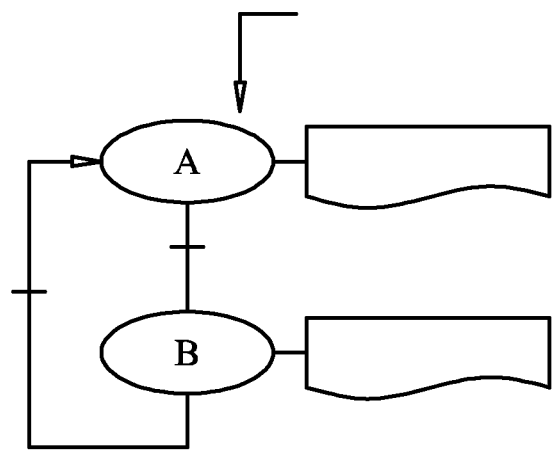
FIG. 4A represents schematically the steps of the procedure for switching the air conditioning system between the first and second filtration modes.
Figure 4B:
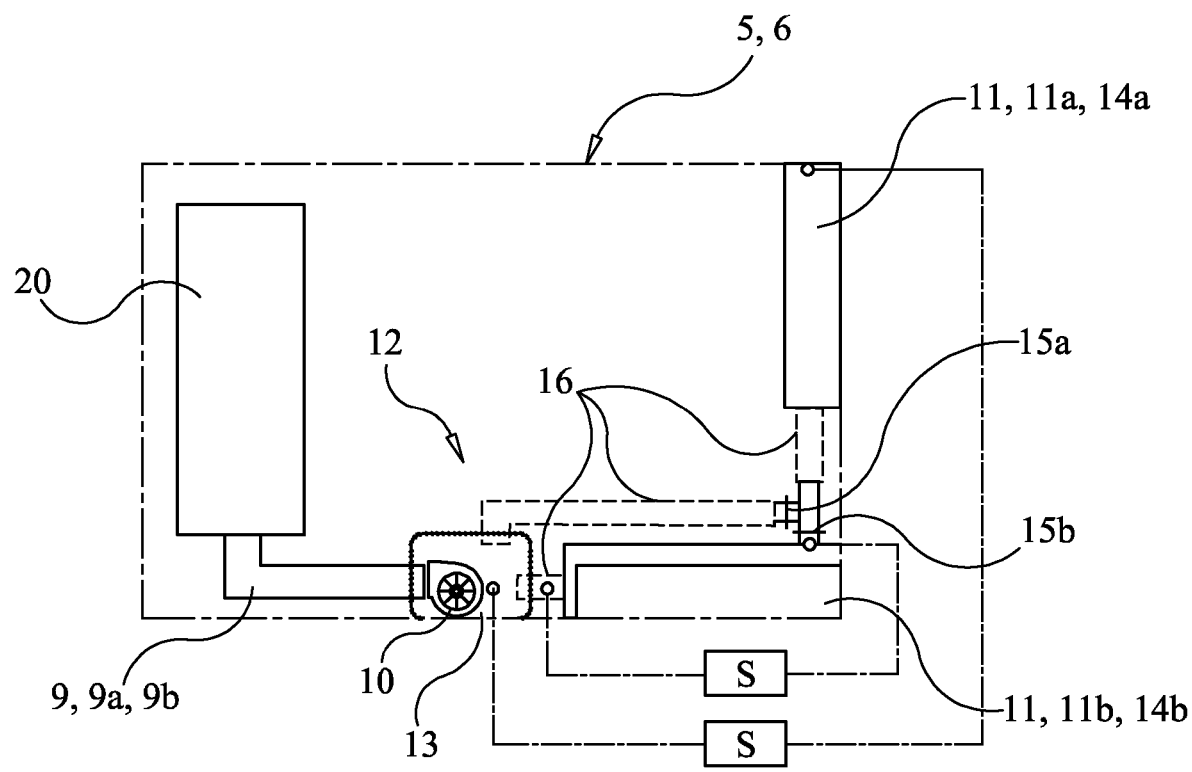
FIG. 4B representing schematically a filtration and pressurization set with switching means according to a second embodiment of the invention.

The air conditioning system 5 includes a filtration and pressurization set 12 which is arranged upstream the circuit 9, the set including a central housing 13, wherein the blowing device 10 is arranged, and two lateral housings 14a, 14b, wherein respectively a first filter 11a and a second filter 11b of the filtration system is arranged. As shown in FIG. 2B, the central 13 and lateral 14a, 14b housings may be constituted by upper 13u, 14au, 14bu and lower 13l, 14al, 14bl housing portions to be assembled together to form the housings. Moreover, FIGS. 2B and 4B represent schematically a filtration and pressurization set 12 according to respectively an embodiment of the invention.

The lateral housings 14a, 14b are in fluid communication with the exterior of the cab 1, so as to allow circulation through the housings of air coming from the exterior and to remove pollutants from the exterior air by the filtration system 11a, 11b arranged within the housings.

Further, the central housing 13 is in fluid communication with the lateral housings 14a, 14b, so as to allow the blowing into the exterior branch 9b of an exterior air flow FE that has been filtered by at least one filtering system 11a, 11b.

The filtering system 11, 11a, 11b may be adapted to remove pollutants. The first filter 11a may have a first filtration level, and the second filter 11b may have a second filtration level for filtering out pollutants. For example, the filters 11a, 11b may comply with the requirements of at least the category 2 defined by standard EN-15695 so as to be able to remove at least the dust pollutants from the air flow to be blown into the cab 1, and more particularly with the requirements of the maximum category 4 of the standard, so as to be able to remove not only dusts, but also aerosol and vapor pollutants from the air flow.

In the exemplary embodiment shown, the air conditioning system 5 includes first 11a and second 11b filter that may comply with the requirements of respectively the categories 2 and 4 of the standard EN-15695. The filters may be made, for example, respectively from paper and from charcoal.

Moreover, the air conditioning system 5 may selectively switch between two filtration modes corresponding respectively to category 2 and 4 filtration levels, wherein the filters 11a, 11b are selectively put in fluid communication with the blowing device 10 according to the desired level of filtration.

As shown in FIGS. 2B and 4B, the switching devices comprise at least one filter selection valve 15 (FIG. 2B), and in particular two selection valves 15a, 15b (FIG. 4B), the valves being arranged in fluid communication paths 16 relaying the central housing 13 to respectively the first category 2 14a and the second category 4 14b filtering housings. The valve(s) are operable to be selectively actuated, in particular by way of an actuator 17 to which the valve is linked through a connector (not shown), respectively in category 2 and 4 filtration modes, wherein the valve(s) close(s)—respectively open(s)—the fluid communication between the category 4 filtration housing 14b and the central housing 13 and open(s)—respectively close(s)—the fluid communication between the category 2 filtration housing 14a and the central housing.

Thus, in a particularly advantageous manner, the operator can benefit from a high level of filtration only when required, in particular only during the performing of a spreading operation in an agricultural field, and can switch to a lower level of filtration, for example of category 2, when the risks of air pollution are lower, for example during road transport between an agricultural field and a farm or between fields. Such a configuration may limit the clogging of the category 4 filters 11b and may substantially increase its lifetime, which is quite short in relation to the lifetime of approximately 1 year of the category 2 filters.

In order to assess the saturation or clogging of the filters 11a, 11b, each housing 14a, 14b may be provided with a pressure differential sensor S, FIG. 4B, which is connected by sensor lines to the upstream and downstream ends of the respective lateral housings 14a, 14b. Thus, the pressure differential sensor signal is constantly monitored by the sensors S and, upon the pressure differential exceeding a limit value, the operator is warned that the one or the other filters 11a, 11b needs replacement, in particular by activating a communication device such as a lighting indicator button, a screen or speaker(s), implemented in the cab 1.

The air conditioning system 5 further includes additional filters 19 that may be arranged at the fluid communication path between the interior of the cab 1 and the outlet of the recycling branch 9a, so as to remove possible air pollutants from the recycled air flow coming from the cab interior. In the exemplary embodiment shown, the additional filters 19 are provided at the inlet of the recycling branch 9a.

The air conditioning system 5 further includes a recycling valve 27 located in the recycling branch 9a, e.g. downstream of the additional filters 19, for selectively opening and closing the recycling branch.

Moreover, the air conditioning system 5 may include a HVAC device 20 (for Heating, Ventilation and Air Conditioning) which is arranged downstream of the circuit 9 for conditioning the air flow blown in the cab 1 through the circuit. The HVAC device including an inlet into which both of the circuit branches 9a, 9b end for feeding the HVAC device with the air flow to be conditioned and blown into the cab 1. The HVAC device 20 includes heat exchangers for cooling or heating the passing air and a circulation blower for blowing the conditioned air into the interior of the cab 1.

The process of operating the air conditioning system 5 may include the following steps.

In particular, the process may include a filtration mode selection procedure wherein the switching devices are operated to select one filtration mode, either upon manual activation of an appropriate way by the operator in the cab 1, for example a button or a switch on a control board within the cab, or upon automatic detection of an appropriate signal corresponding to the actuation state of the spreading unit.

More precisely, the filtration mode selection procedure provides a first step A, in which the system assesses whether the cab 1 is provided with both category 2 and category 4 filters 11a, 11b and puts the selection valves 15, 15a, 15b in the category 2 filtration mode. The recycling valve 27 is in its default position, which is the open state to allow the flow FR of interior air through the recycling branch 9a to the HVAC device 20.

Afterward, the filtration mode selection procedure provides a second step B, wherein the air conditioning system 5 may be operated to put the selection valves 15, 15a, 15b in the category 4 filtration mode. Here, the selection procedure provides for the monitoring of appropriate signals, for example the manual actuation of a command means in the cab 1 or the actuation/deactivation of the spreading unit, and to perform switching from one filtration mode to another, according to the results of the monitoring.

Figure 5:
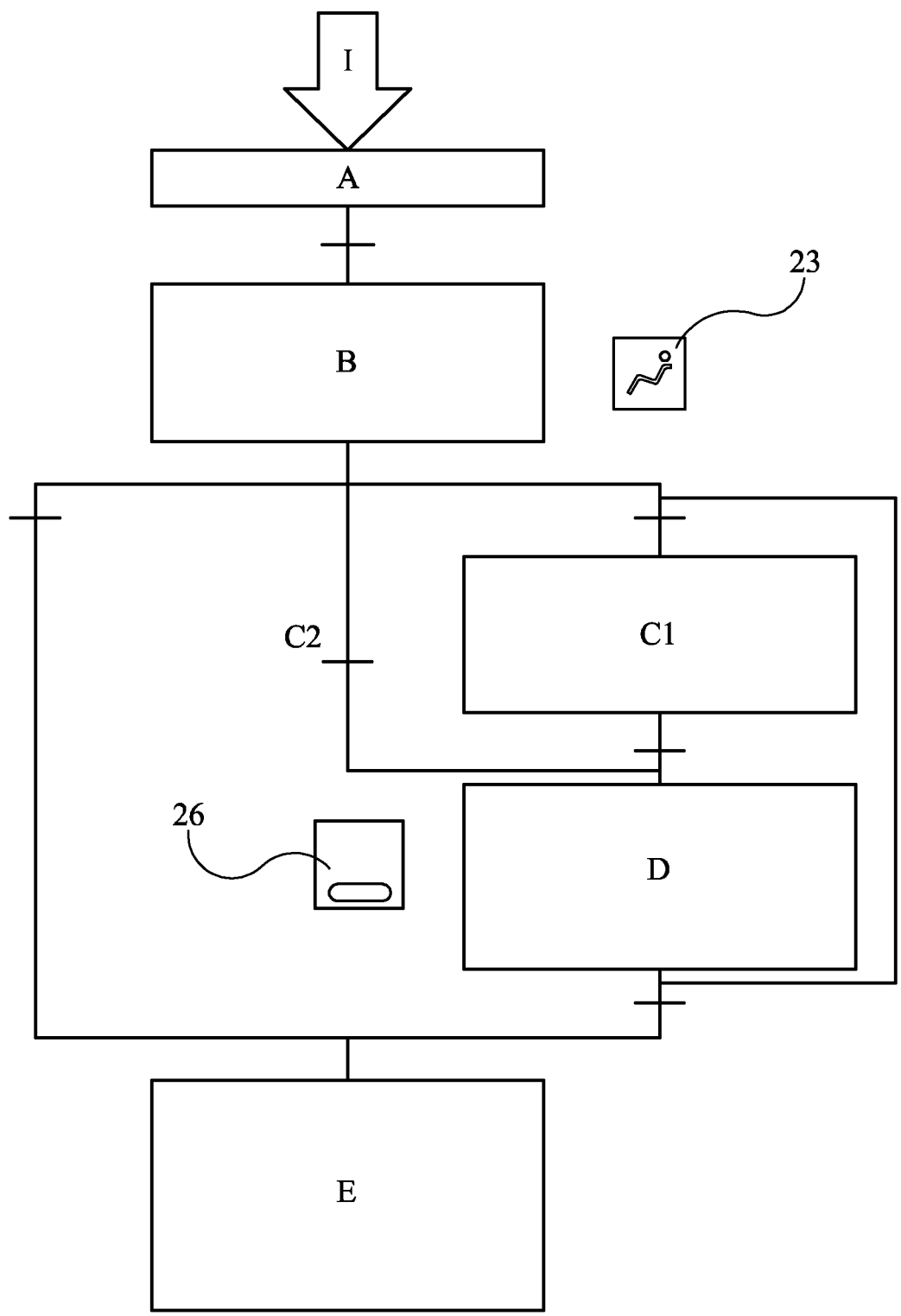
FIG. 5 represents schematically the steps of a process according to the invention.

Additionally, the process can provide for performing the filtration mode selection procedure upon initial actuation I of the air conditioning system 5. In particular, as shown in FIG. 5, the category 2 mode selection step A is performed just after the initial actuation step I, so as to put by default the filtration and pressurization set 12 in the category 2 filtration mode.

Afterwards, the process provides for monitoring an appropriate signal as described above and for performing the category 4 mode selection step B upon the detection of such signal. In particular, the process can provide for informing the operator that the filtration and pressurization set 12 is in the category 4 filtration mode, in particular by lighting an indicator button 23 and/or displaying an icon on a screen in the cab 1.

Figure 3:
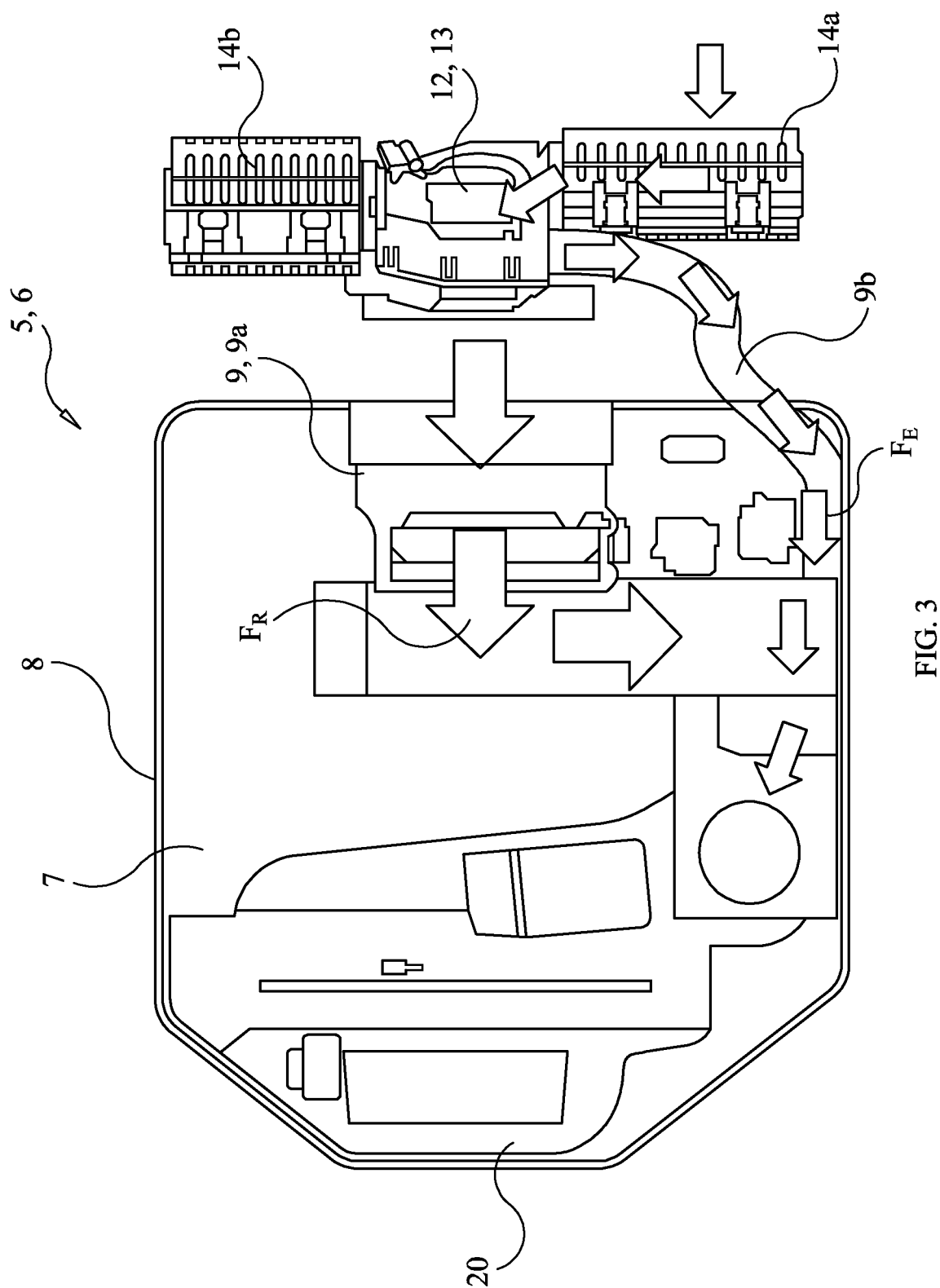
FIG. 3 represents schematically in a top view the operation of the air-conditioning system of FIG. 1 during the regular procedure, the air-conditioning system being arranged in a first filtration mode.
Figure 6A:
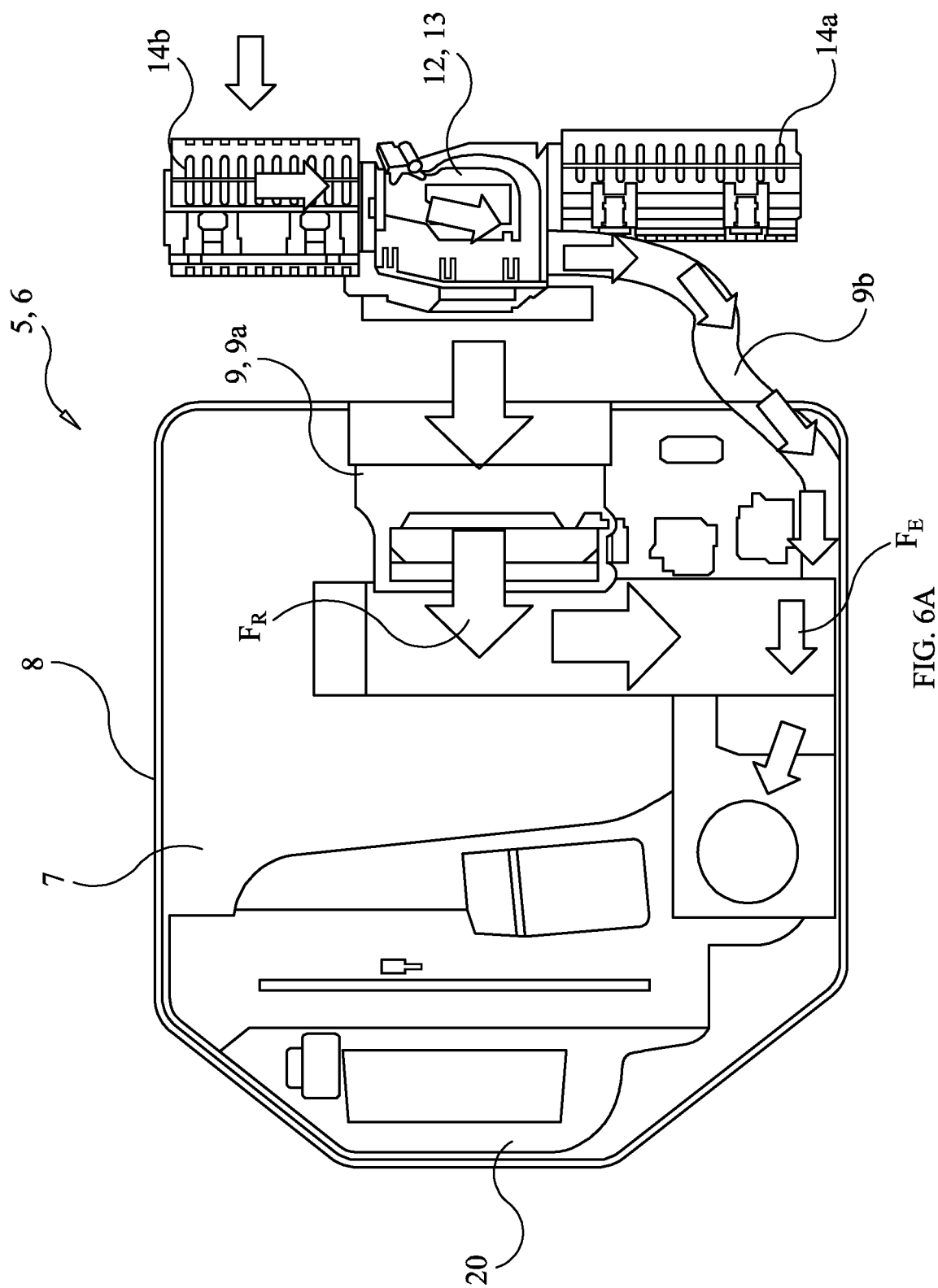
FIGS. 6A-6B represent schematically in a top view the operation of the air conditioning system of FIG. 1 which is arranged in a second filtration mode, respectively during the regular procedure (FIG. 6A) and during the flushing procedure (FIG. 6B).

The process then may automatically proceed to a step E for performing a regular procedure, described with reference to FIGS. 3 and 6A. Herein, the air conditioning system 5 is operated to balance the air supplied by each of the recycling 9a and exterior 9b branches of the circuit 9, whatever the filtration mode selected.

In particular, the air conditioning system 5 is operable to balance, in the supplied air flow, the amount of air coming from the recycling branch 9a versus the amount of air coming from the exterior branch 9b. Moreover, the regular procedure can provide for operating the air conditioning system 5 to supply the cab 1 with a total flow of air including approximately 80% of a flow $F_R$ of recycled air coming from the recycling branch 9a and approximately 20% of a flow $F_E$ of exterior air coming from the exterior branch 9b.

Moreover, to comply with the various standards, for example the requirements of at least the category 2 defined by standard EN-15695, the regular procedure can provide for operating the air conditioning system 5, and in particular the blowing device 10, so that the air flow $F_E$ from the exterior branch 9b supplied in the cab 1 presents a flow rate of at least 30 m$^3$/h with an overpressure in the cab of at least 20 Pa.

As illustrated in FIG. 5, the process provides for performing the regular procedure upon initial actuation I of the air conditioning system 5, the steps A, B of the filtration mode selection procedure being performed during the regular procedure just after the initial actuation step I.

Thus, during the regular procedure, the cab 1 is regularly supplied with a flow of fresh air $F_R$, $F_E$ coming from both the interior and the exterior of the cab 1. The flow being previously filtered by appropriate filtration means 11, 11a, 11b, 19 for removing pollutants generated in particular by the spreading product before being blown into the cab.

However, the regular procedure may not provide sufficient filtration for the operator from such pollutants when polluted air has already entered into the cab 1. For example, upon opening by the operator of an access 4 of the cab, in particular as the flow of air $F_R$, FE supplied by the air conditioning system 5 mainly includes a flow of recycled air $F_R$ coming from the interior of the cab, i.e. potentially polluted air.

The process may further include the monitoring of a signal indicative of a potential contamination of the interior of the cab 1 and, upon the detection of such signal, the process may provide for performing a flushing procedure wherein the air conditioning system 5 is operated to remove the contamination by flushing of the air within the cab 1.

In particular, as stated above, the process can provide the monitoring of a signal initiated by the occurrence of an access 4 of the cab 1, for example the access door 4 or a window, as the cab 1 may effectively be contaminated upon entry through an open access 4 of air polluted with the spreading product. In relation to FIG. 5, the process provides a step C1 wherein the occurrence of an access 4 of the cab 1 is detected, and then a consecutive step D wherein the flushing procedure is performed upon the detection.

To do so, the air conditioning system 5 includes various devices for monitoring such an occurrence signal. For example, the condition system 5 may include at least one air flow sensor 24, pressure sensor 25, and/or a door sensor implemented within the cab 1. The air flow and/or pressure sensors 24, 25 can be configured for monitoring the changes of air flow and/or pressure within the cab 1 due to a potential opening or closing of an access 4 of the cab 1. At least one pressure sensor can also be configured for providing an opening signal and a closing signal of the access such that the flushing procedure is performed only upon a detection of the closing signal.

Moreover, the process can provide the monitoring of a signal initiated by a manual activation of an appropriate way by the operator in the cab 1, for example a button or a switch on a control board within the cab. Thus, in relation to FIG. 5, the process provides a step C2 wherein the actuation by the operator is detected, the step D of flushing procedure being performed upon the detection.

Generally, the process can provide for checking, during the monitoring steps C1, C2, the closing of all accesses 4 of the cab 1 before performing the step D or flushing procedure. Indeed, for performing the flushing procedure in the best conditions, it is necessary to stop at first potential entries of polluted air within the cab 1, the stopping being in particular achieved through the total closing of accesses 4 of the cab.

In particular, in the case of an occurrence of an access 4 of the cab 1, the process can provide the monitoring of consecutive opening and closing signals of the access, in particular by performing step C1 upon detection of the opening signal and by monitoring the consecutive closing signal during this step C1, so as to perform the step D of flushing procedure only upon the detection of the closing signal.

Moreover, in the case of a manual actuation by the operator, the process can provide for checking the closing of all accesses 4 of the cab 1 and, in the case when at least one of the accesses is open, for alerting the operator of such opening, for example through the displaying of an error message on the control board in the cab 1.

Once all the above mentioned conditions are met, the process provides for performing the step D of flushing procedure. In particular, the process can provide for informing the operator that the flushing procedure is to be performed, in particular by actuating an indicator lighting button 26 on the control board or displaying an icon on a screen in the cab 1.

During the step D, the flushing procedure may provide for operating the air conditioning system 5 to increase the flow of air supplied in the cab 1 by the blowing device 10 through the circuit 9, so as to accelerate the evacuation of potentially polluted air within the cab 1. In particular, the flushing procedure may provide for operating the blowing device 10 to supply the cab 1 with an air flow having a flow rate greater than 40 m³/h.

Figure 6B:
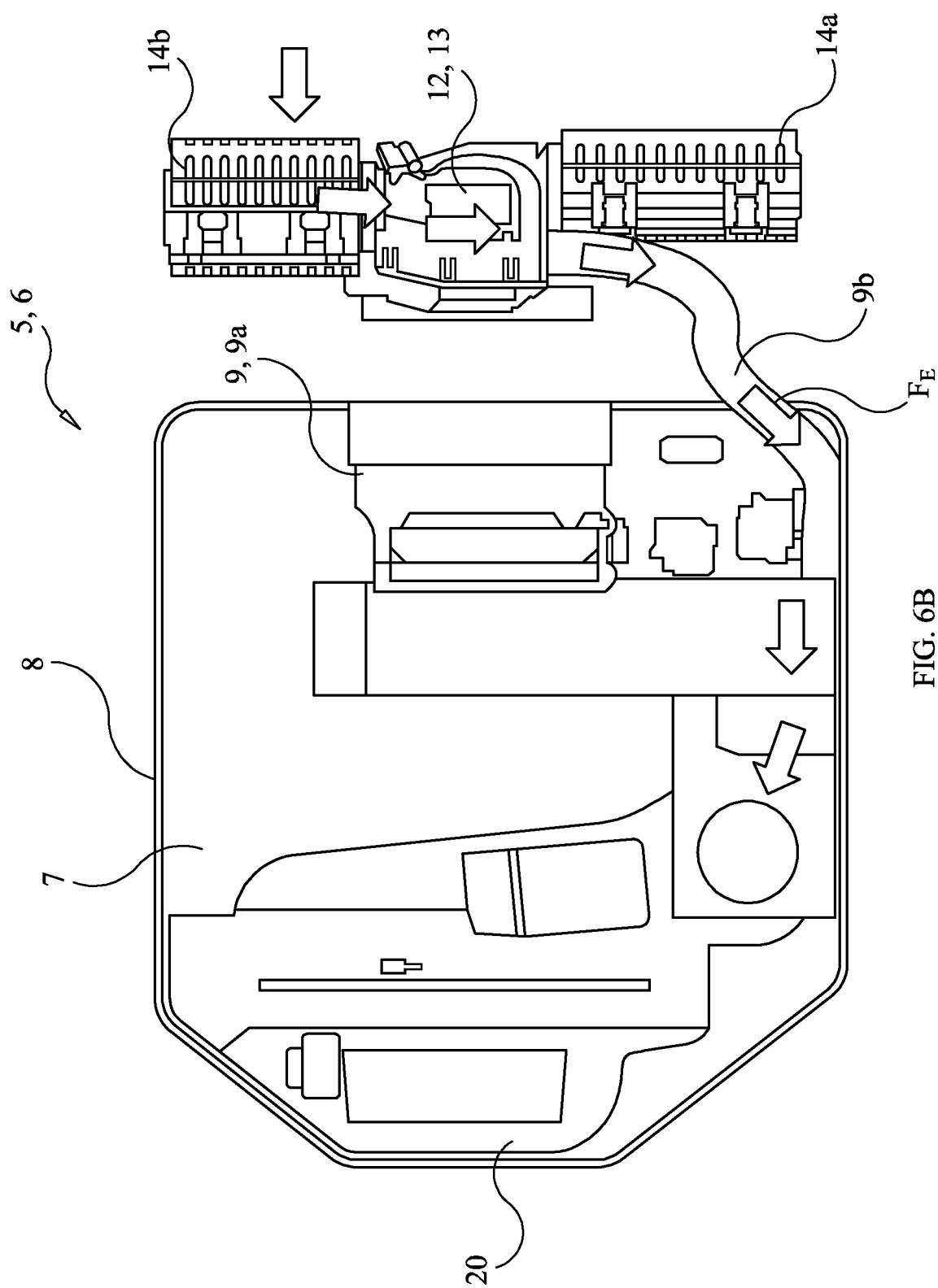

Moreover, to avoid recycling of potentially contaminated air coming from the interior of the cab 1, the flushing procedure may provide, as represented in FIG. 6B, to balance the flow of air $F_E$ only in the exterior branch 9b of the circuit 9 by closing the recycling branch 9a.

To do so, the process provides for using the recycling valve 27 located in the recycling branch 9a for selectively opening and closing the recycling branch, the flushing procedure providing to operate the recycling valve for closing the recycling branch.

Besides, to increase the flow of air evacuated from the cab 1, the flushing procedure provides to open an exhaust flap 28 located in a bottom wall or roof of the cab 1, through which the flow of air can be guided to the exterior of the cab. At the end of the flushing procedure, the exhaust flap 28 is closed again, to restore the regular procedure conditions.

In particular, the process may provide for performing the step D of flushing procedure for a determined period of time before performing again the regular procedure, in particular by stopping the step D of flushing procedure after the expiry of the period of time and for relaunching step E for restoring such regular procedure upon the stopping. According to an exemplary embodiment, the determined period of time is fixed, in particular comprised between 120 s and 140 s, according to the total volume of the cab 1 and the flow rates of air flow evacuated from the cab.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A process for operating a machine having a cab having an access, comprising the steps of:
providing an air conditioning system including a circuit configured for supplying the cab with air coming from a recycling branch fed with air coming from an interior of the cab and an exterior branch fed with air coming from an exterior of the cab, a fan for providing an air flow inside the circuit, a filtration system for removing pollutants from the air blown in the cab through the circuit, the air conditioning system being operable to control an amount of air coming from the recycling branch versus an amount of air coming from the exterior branch in a supplied air flow;

operating the air conditioning system in a regular procedure for controlling the air supplied by each of the recycling and exterior branches;

monitoring a consecutive opening signal and a closing signal of the access;

only upon a detection of the closing signal, operating the air conditioning system in a flushing procedure, wherein the flushing procedure of the air conditioning system includes:

increasing the air flow supplied in the cab by the fan through the circuit;

controlling a flow of air to supply air coming only from the exterior branch by closing the recycling branch; and opening an exhaust flap within the cab for increasing a flow of air evacuated from the cab the flushing procedure being performed for a determined period of time before performing the regular procedure again.

2. The process according to claim 1, wherein the filtration system includes a first filter having a first level of filtration for removing pollutants.

3. The process according to claim 2, wherein the filtration system further includes a second filter having a second level of filtration for removing pollutants.

4. The process according to claim 3, wherein the air conditioning system further includes at least one filter selection valve, and the process further includes a step of switching from the first filter to the second filter, by the at least one filter selection valve, to filter air coming from the exterior branch at the second level of filtration for removing pollutants.

5. The process according to claim 1, wherein the process further includes a step of checking a closing of the at least one access of the cab before performing the flushing procedure.

6. The process according to claim 1, wherein the regular procedure provides for operating the air conditioning system so that the air flow from the exterior branch supplied in the cab presents a flow rate of at least 30 m³/h with an overpressure in the cab of at least 20 Pa.

7. The process according to claim 1, wherein the flushing procedure provides for operating the fan to supply the cab with the air flow having a flow rate greater than 40 m³/h.

8. The process according to claim 1, wherein the determined period of time for performing the flushing procedure is between 120 and 140 seconds.

9. A machine, comprising:
a cab having an interior and an exterior and an access; and
an air conditioning system including:

a circuit configured for supplying the cab with air coming from a recycling branch fed with air coming from the interior of the cab and an exterior branch fed with air coming from the exterior of the cab;

an exhaust flap within the cab;

a fan for providing an air flow inside the circuit;

a filtration system for removing pollutants from the air blown in the cab through the circuit, the air conditioning system being operable to control an amount of air coming from the recycling branch versus an amount of air coming from the exterior branch in a supplied air flow such that the air conditioning system is operable in a regular procedure and a flushing procedure for a determined period of time before operating in the regular procedure again; and at least one pressure sensor configured for monitoring a consecutive opening and closing of the access of the cab and for providing an opening signal and a closing signal of the access such that the flushing procedure is performed only upon a detection of the closing signal, wherein in the regular procedure the air conditioning system controls the air supplied by each of the recycling and exterior branches, and wherein in the flushing procedure the air conditioning system increases the air flow supplied in the cab by the fan through the circuit, closes the recycling branch, thereby only allowing air coming from the exterior branch, and opens the exhaust flap for increasing a flow of air evacuated from the cab, the flushing procedure being performed before performing the regular procedure again.

10. The machine according to claim 9, wherein the filtration system includes a first filter having a first level of filtration for removing pollutants.

11. The machine according to claim 10, wherein the filtration system further includes a second filter having a second level of filtration for removing pollutants.

12. The machine according to claim 11, wherein the air conditioning system further includes at least one filter selection valve configured for selectively switching between the first filter and the second filter.

* * * * *